US010754756B2

(12) United States Patent
Ocariza, Jr. et al.

(10) Patent No.: US 10,754,756 B2
(45) Date of Patent: Aug. 25, 2020

(54) SOFTWARE PERFORMANCE REGRESSION ANALYSIS USING EXECUTION TIMELINES

(71) Applicant: SAP SE, Walldorf (DE)

(72) Inventors: Frolin S. Ocariza, Jr., Richmond (CA); Boyang Zhao, Burnaby (CA)

(73) Assignee: SAP SE, Walldorf (DE)

( * ) Notice: Subject to any disclaimer, the term of this patent is extended or adjusted under 35 U.S.C. 154(b) by 37 days.

(21) Appl. No.: 15/994,440

(22) Filed: May 31, 2018

(65) Prior Publication Data

US 2019/0310931 A1    Oct. 10, 2019

Related U.S. Application Data

(60) Provisional application No. 62/653,101, filed on Apr. 5, 2018.

(51) Int. Cl.
*G06F 11/36* (2006.01)
*G06F 11/34* (2006.01)
*G06F 8/71* (2018.01)

(52) U.S. Cl.
CPC ............ *G06F 11/3636* (2013.01); *G06F 8/71* (2013.01); *G06F 11/3419* (2013.01); *G06F 11/3466* (2013.01); *G06F 11/3612* (2013.01); *G06F 11/3664* (2013.01); *G06F 11/3672* (2013.01); *G06F 2201/81* (2013.01); *G06F 2201/865* (2013.01)

(58) Field of Classification Search
CPC .... G06F 16/9024; G06F 8/71; G06F 2201/81; G06F 2201/865; G06F 11/36–3696; G06F 8/77

USPC .......... 717/124–135; 714/38.1–38.14, 45, 46
See application file for complete search history.

(56) References Cited

U.S. PATENT DOCUMENTS

| | | | |
|---|---|---|---|
| 7,165,245 B2 * | 1/2007 | Robison | G06F 8/43 717/145 |
| 9,774,654 B2 * | 9/2017 | Tran | H04L 67/025 |
| 9,817,804 B2 * | 11/2017 | Goldstein | G06F 16/9577 |

(Continued)

OTHER PUBLICATIONS

Alcocer, J.P.S., Horizontal Profiling: A Sampling Technique to Identify Performance Regresssions, Universidad De Chile [online], 2016 [retrieved Sep. 1, 2019], Retrieved from Internet: <URL:http://repositorio.uchile.cl>, pp. i-78.*

(Continued)

*Primary Examiner* — Todd Aguilera
(74) *Attorney, Agent, or Firm* — Fountainhead Law Group P.C.

(57) ABSTRACT

In one embodiment, a method receives execution timelines that include nodes representing function calls and execution times from executing a first version of an application and a second version of the application. The method selects pairs of nodes from a first set of nodes from a first execution timeline and a second set of nodes from a second execution timeline. The method then iterates through the pairs of nodes to determine (1) whether a node in the second execution timeline is not included in the first execution timeline and has an execution time slower than a set difference; or (2) whether a first node in the second execution timeline has an execution time slower than a second node in the first execution timeline by the set difference. A critical graph is generated that defines a path of nodes that lead to a node that has been identified as a performance regression cause.

20 Claims, 12 Drawing Sheets

(56) References Cited

U.S. PATENT DOCUMENTS

| | | | |
|---|---|---|---|
| 2002/0162096 A1* | 10/2002 | Robison | G06F 8/43 717/145 |
| 2011/0258617 A1* | 10/2011 | Park | G06F 11/3612 717/157 |
| 2015/0154164 A1* | 6/2015 | Goldstein | G06F 16/9577 715/229 |
| 2015/0178178 A1* | 6/2015 | Park | G06F 11/3612 717/133 |
| 2016/0226736 A1* | 8/2016 | Tran | H04L 67/025 |

OTHER PUBLICATIONS

Dullien, T., et al., "Graph-based comparison of Executable Objects", Symposium sur la Securite des Technologies de l'Information et des Communications [online], 2005 [retrieved Sep. 1, 2019], Retrieved from Internet: <URL: https://citeseerx.ist.psu.edu/viewdoc/summary?doi=10.1.1.96.5076>, pp. 1-13.*

S. Zaman, B. Adams, and A. E. Hassan, "A qualitative study on performance bugs," in Proceedings of the IEEE Working Conference on Mining Software Repositories (MSR). IEEE Computer Society, 2012, pp. 199-208.

M. Selakovic and M. Pradel, "Performance issues and optimizations in JavaScript: an empirical study," in Proceedings of the International Conference on Software Engineering (ICSE). ACM, 2016, pp. 61-72.

W. Shang, A. E. Hassan, M. Nasser, and P. Flora, "Automated detection of performance regressions using regression models on clustered performance counters," in Proceedings of the International Conference on Performance Engineering (ICPE). ACM, 2015, pp. 15-26.

J. Chen and W. Shang, "An exploratory study of performance regression introducing code changes," in Proceedings of the International Conference on Software Maintenance and Evolution (ICSME). IEEE Computer Society, 2017, pp. 341-352.

F. Pinto, U. Kulesza, and C. Treude, "Automating the performance deviation analysis for multiple system releases: An evolutionary study," in Proceedings of the International Working Conference on Source Code Analysis and Manipulation (SCAM). IEEE Computer Society, 2015, pp. 201-210.

J. P. Sandoval Alcocer, A. Bergel, and M. T. Valente, "Learning from source code history to identify performance failures," in Proceedings of the International Conference on Performance Engineering (ICPE). ACM, 2016, pp. 37-48.

T. H. Nguyen, M. Nagappan, A. E. Hassan, M. Nasser, and P. Flora, "An industrial case study of automatically identifying performance regression-causes," in Proceedings of the International Working Conference on Mining Software Repositories (MSR). ACM, 2014, pp. 232-241.

Q. Luo, D. Poshyvanyk, and M. Grechanik, "Mining performance regression inducing code changes in evolving software," in Proceedings of the International Conference on Mining Software Repositories (MSR). ACM, 2016, pp. 25-36.

M. Woodside, G. Franks, and D. C. Petriu, "The future of software performance engineering," in Proceedings of the International Conference on the Future of Software Engineering (FOSE). IEEE Computer Society, 2007, 16 pages.

Rosetta Code, "Longest common subsequence," 2017, http://rosettacode.org/wiki/Longest common subsequence (Accessed:Jan. 22, 2018).

Google, "Chrome DevTools Overview," 2018, https://developer.chrome.com/devtools (Accessed: Feb. 19, 2018).

Graphviz, "The DOT Language," 2018, https://graphviz.gitlab.io/pages/doc/info/lang.html (Accessed: Feb. 19, 2018).

E. R. Gansner, E. Koutsofios, S. C. North, and K.-P. Vo, "A technique for drawing directed graphs," Transactions on Software Engineering (TSE), vol. 19, No. 3, 33 pages, 1993.

A. L. Research, "GraphViz," 2018, http://graphviz.org/ (Accessed: Feb. 19, 2018).

M. Daines, "viz-js," 2014, http://viz-js.com/ (Accessed: Feb. 19, 2018).

P. Irish, "DevTools Timeline Model," 2016, https://github.com/paulirish/devtools-timeline-model (Accessed: Feb. 19, 2018).

H. Malik, B. Adams, and A. E. Hassan, "Pinpointing the subsystems responsible for the performance deviations in a load test," in Proceedings of the International Symposium on Software Reliability Engineering (ISSRE). IEEE Computer Society, 2010, pp. 201-210.

C. Heger, J. Happe, and R. Farahbod, "Automated root cause isolation of performance regressions during software development," in Proceedings of the International Conference on Performance Engineering (ICPE). ACM, 2013, pp. 27-38.

A. Nistor, T. Jiang, and L. Tan, "Discovering, reporting, and fixing performance bugs," in Proceedings of the Working Conference on Mining Software Repositories (MSR). IEEE Computer Society, 2013, pp. 237-246.

O. Lhot'ak, "Comparing call graphs," in Proceedings of the ACM SIGPLAN-SIGSOFT Workshop on Program Analysis for Software Tools and Engineering (PASTE). ACM, 2007, 6 pages.

G. C. Murphy, D. Notkin, W. G. Griswold, and E. S. Lan, "An empirical study of static call graph extractors," Transactions on Software Engineering and Methodology (TOSEM), vol. 7, No. 2, pp. 158-191, 1998.

Microsoft, "How to: Compare Performance Data Files," 2015, https://msdn.microsoft.com/en-us/library/bb385753.aspx (Accessed: Feb. 19, 2018).

JetBrains, "Comparing Profiling Data," 2018, https://www.jetbrains.com/help/profiler/Studying Profiling Results Comparing Profiling Data.html (Accessed: Feb. 19, 2018).

EJ Technologies, "JProfiler," 2016, https://www.ej-technologies.com/products/jprofiler/whatsnew92.html (Accessed: Feb. 19, 2018).

T. M. Ahmed, C.-P. Bezemer, T.-H. Chen, A. E. Hassan, and W. Shang, "Studying the effectiveness of application performance management (apm) tools for detecting performance regressions for web applications: an experience report," in Proceedings of the International Conference on Mining Software Repositories (MSR). ACM, 2016, pp. 1-12.

D. Maier, "The complexity of some problems on subsequences and supersequences," Journal of the ACM (JACM), vol. 25, No. 2, pp. 322-336, 1978.

* cited by examiner

Algorithm 1: compareTimelinePairs

Input: $S_{old}$: The set of old timelines
Input: $S_{new}$: The set of new timelines, with $|S_{old}| = |S_{new}|$
Input: $\mu$: The minimum response time difference to track
Output: $C$: Set of critical graphs 1  $C \leftarrow \emptyset$;
2  $\mathbf{A}_{old} \leftarrow$ toArray($S_{old}$);
3  $\mathbf{A}_{new} \leftarrow$ toArray($S_{new}$);
4  for $i \leftarrow 1$ to $|S_{old}|$ do
5  $\quad r_{old} \leftarrow$ pruneTree($\mathbf{A}_{old,i}$);
6  $\quad r_{new} \leftarrow$ pruneTree($\mathbf{A}_{new,i}$);
7  $\quad G \leftarrow$ findCriticalGraph(($r_{old}, r_{new}$), $\mu$, true);
8  $\quad C \leftarrow C \cup \{G\}$;
9  end

FIG. 5

Algorithm 2: findCriticalGraph

Input: $(r_{old}, r_{new})$: A pair of nodes, where $r_{old}$ is from the old timeline and $r_{new}$ is from the new timeline. $r_{old}$ and $r_{new}$ are assumed to be matching nodes.
Input: $\mu$: The minimum response time difference to track
Input: *useAlternate*: If true, an alternate matching algorithm will be used instead of "longest common subsequence"
Output: G: The critical graph when comparing the tree rooted at $r_{old}$ and the tree rooted at $r_{new}$ 1  $r_G \leftarrow$ copy of $r_{new}$;
2  $r_G.children \leftarrow []$;
3  $G(V_G, E_G) \leftarrow (\{r_G\}, \emptyset)$;
4  $M \leftarrow$ findMatchingNodes(($r_{old}.children, r_{new}.children), \mu,$ useAlternate);
5  for $i \leftarrow 1$ to $|M|$ do
6    $(v_{old}, v_{new}) \leftarrow M_i$;
7    if $v_{old} = null$ then
8      $r_G.children.add(v_{new})$;
9      $V_G \leftarrow V_G \cup \{v_{new}\}$;
10     $E_G \leftarrow E_G \cup \{(r_G, v_{new})\}$;
11   else
12     $H \leftarrow$ findCriticalGraph($(v_{old}, v_{new}), \mu,$ false);
13     $r_H \leftarrow$ root of $H$;
14     $r_G.children.add(r_H)$;
15     $V_G \leftarrow V_G \cup \{r_H\}$;
16     $E_G \leftarrow E_G \cup \{(r_G, r_H)\}$;
17   end
18 end

Algorithm 3: findMatchingNodes

Input: $(B_{old}, B_{new})$: A pair of arrays containing the nodes that need to be matched, where $B_{old}$ is an array of child nodes from the old timeline and $B_{new}$ is an array of child nodes from the new timeline.
    Input: $\mu$: The minimum response time difference to track
    Input: *useAlternate*: If true, an alternate matching algorithm will be used instead of "longest common subsequence"
    Output: M: An array of matching nodes, represented as pairs $(v_{old}, v_{new})$. Note that for some pairs in this array, $v_{old}$ may be *null* if $v_{new}$ has no matching node but $v_{new}.time \geq \mu$ 1. $M \leftarrow [\,]$;
2. $(J, K) \leftarrow$ longestCommonSubsequence$(B_{old}, B_{new})$;
3. if $J$ *is null* $\lor$ *useAlternate* then
    /* Either longestCommonSubsequence took too long to execute or top-level functions are being compared, so try alternate matching. */
4.     $(J, K) \leftarrow ([\,], [\,])$;
5.     $hm_{old} \leftarrow$ hash map of (key, value) pairs $(k, v)$;
6.     for $i \leftarrow 1$ to $|B_{old}|$ do
7.         $next \leftarrow B_{old,i}$;
8.         if *(next.component, next.name)* $\notin hm_{old}.keys$ then
9.             $hm_{old}[(next.component, next.name)] \leftarrow [\,]$;
10.         end
11.         $hm_{old}[(next.component, next.name)].add(i)$;
12.     end
13.     for $i \leftarrow 1$ to $|B_{new}|$ do
14.         $next \leftarrow B_{new,i}$;
15.         if *(next.component, next.name)* $\in hm_{old}.keys$ then
16.             $oldIndex \leftarrow hm_{old}[(next.component, next.name)]_1$;
17.             $J.add(oldIndex)$;
18.             $K.add(i)$;
19.             $hm_{old}[(next.component, next.name)].remove(oldIndex)$;
20.         end
21.     end
22. end
23. for $i \leftarrow 1$ to $|B_{new}|$ do
24.     $next \leftarrow B_{new,i}$;
25.     if $i$ *is in the array* $K$ then
26.         $kIndex \leftarrow K.indexOf(i)$;
27.         $oldIndex \leftarrow J_{kIndex}$;
28.         if $next.time - B_{old,oldIndex}.time \geq \mu$ then
29.             $M.add((B_{old,oldIndex}, next))$;
30.         end
31.     else if $next.time \geq \mu$ then
32.         $M.add((null, next))$;
33.     end
34. end

FIG. 7

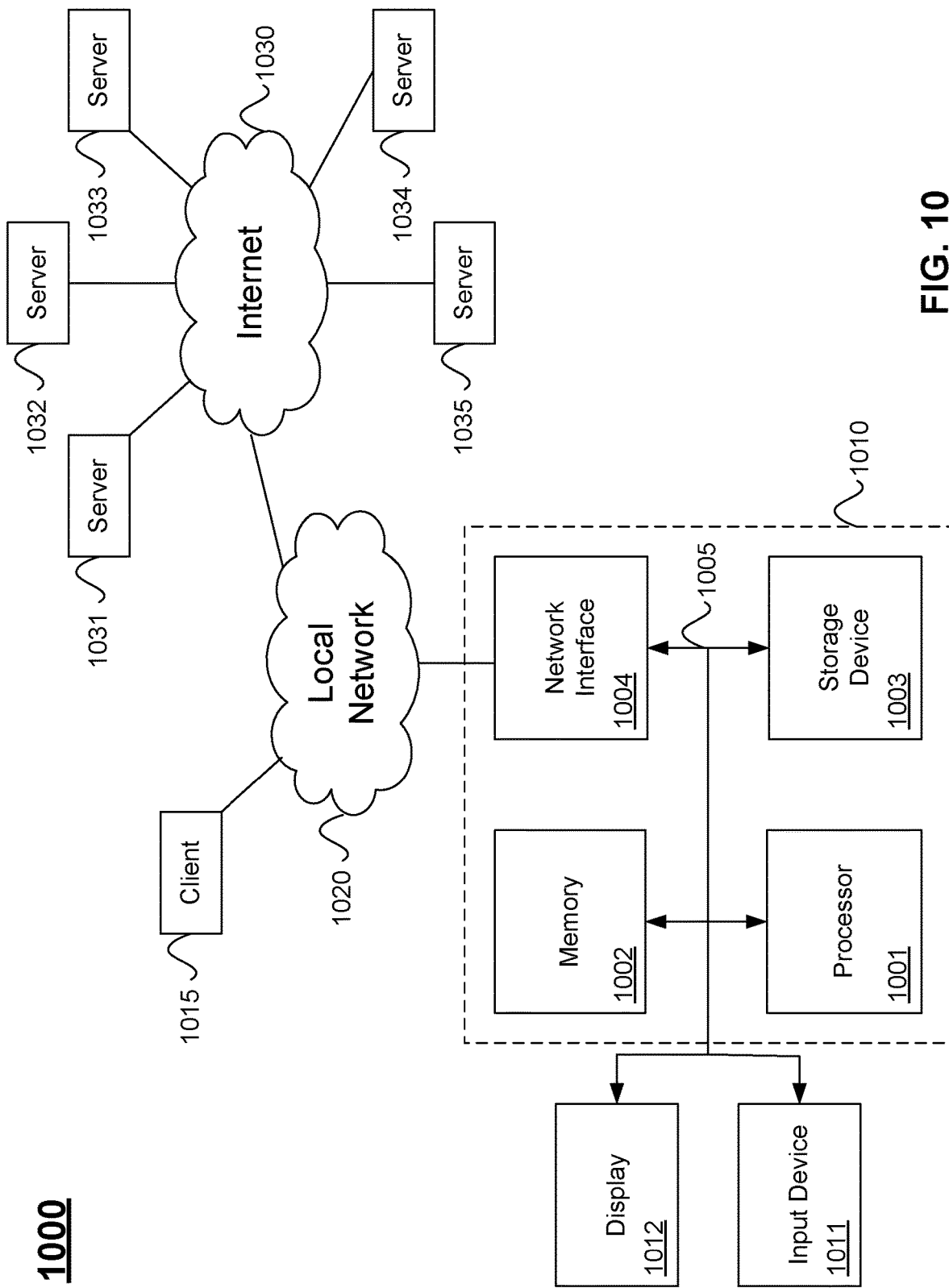

SOFTWARE PERFORMANCE REGRESSION ANALYSIS USING EXECUTION TIMELINES

CROSS REFERENCE TO RELATED APPLICATIONS

The present disclosure claims priority to U.S. Provisional App. No. 62/653,101, entitled "LOCALIZING SOFTWARE PERFORMANCE REGRESSIONS BY COMPARING EXECUTION TIMELINES", filed Apr. 5, 2018, the contents of which is incorporated herein by reference in its entirety.

BACKGROUND

Software performance testing detects software code changes that may have slowed down the execution of an application, which may be referred to as performance regressions. The application slowdowns may have a negative effect on user experience while using the application, and can therefore deter many users from continuing to use the application.

Finding the cause of the performance regression, referred to as a performance regression cause, is a very time-consuming process when performed manually. For example, typically, execution timelines for the two versions of the application need to be generated by observing one version before the performance regression and observing another version after the performance regression. An execution timeline may be a call tree describing the functions that were executed while the user was interacting with the application where the call tree is augmented with information on how long each function took to execute. Then, a user must analyze and compare the performance results included in the execution timelines. For example, the user would usually have to compare the functions in the call trees one-by-one, recursively going down the call trees until the lowest level function that regressed is discovered. Knowing the lowest level function may provide a strong lead to the code change that caused the regression or contains the code change itself.

The above process is further complicated by variance in the performance numbers, which often necessitates multiple execution timelines to be generated per version and hence for multiple timelines to be analyzed and compared. It is further difficult to conduct the above analysis when performance regressions are observed at the client side of web applications due to challenges associated with software code being executed, such as JavaScript™. For example, web applications rely on features that exploit the asynchronous nature of the software code (e.g., timers, promises, callbacks, etc.), which can lead to large execution timelines involving multiple call trees—one for each asynchronous execution. These timelines are very difficult for the user to compare manually given their size. Further, JavaScript™ is an event-driven language, which means simple user interactions (e.g., mouse outs, hovers, scrolls, etc.) may trigger event handlers that may be irrelevant to the performance regression, thereby introducing noise to the execution timelines being compared. Accordingly, performing the analysis manually may be time-consuming and also prone to errors due to the complexity of the analysis. Realistically, the analysis could not be performed manually in an acceptable time limit or at all.

BRIEF DESCRIPTION OF THE DRAWINGS

FIG. 5 depicts an example of algorithm #1 of the function compareTimelinePairs according to some embodiments.

FIG. 6 depicts an algorithm #2 of the function findCriticalGraph according to some embodiments.

FIG. 7 depicts an example of the findMatchingNodes function according to some embodiments.

FIG. 10 illustrates hardware of a special purpose computing machine configured with the performance regression manager according to one embodiment.

DETAILED DESCRIPTION

Described herein are techniques for a software performance analysis system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments automatically determine performance regression causes by comparing the execution timelines of different versions of an application (e.g., before a code change and after a code change to the application). In some embodiments, performance regression causes may be determined in web applications, but can be used to determine performance regression causes in other types of applications. A performance regression manager does not presuppose the existence of a repository of past performance regression causes. Rather, the performance regression manager works directly with an execution trace of the application under test and factors the execution times in the analysis for the performance regression causes. Using the execution times allows for more precise results because the analysis aims to reveal code changes based on actual increases in execution time, as opposed to trying to pinpoint changes based merely on code patterns or counter signatures. Additionally, the performance regression manager may aggregate results of multiple pairs of execution timelines to generate the performance regression causes. The aggregation may limit false positives where one test identified a function as a performance regression cause, but all the other tests did not.

In some embodiments, the performance regression manager outputs a critical graph that describes the function call path to each performance regression cause. The performance regression cause may be defined as the lowest level function in the execution timeline that regressed in performance. A user can use the critical graph as an indicator to determine the code change that caused the regression.

System

Figure 1:
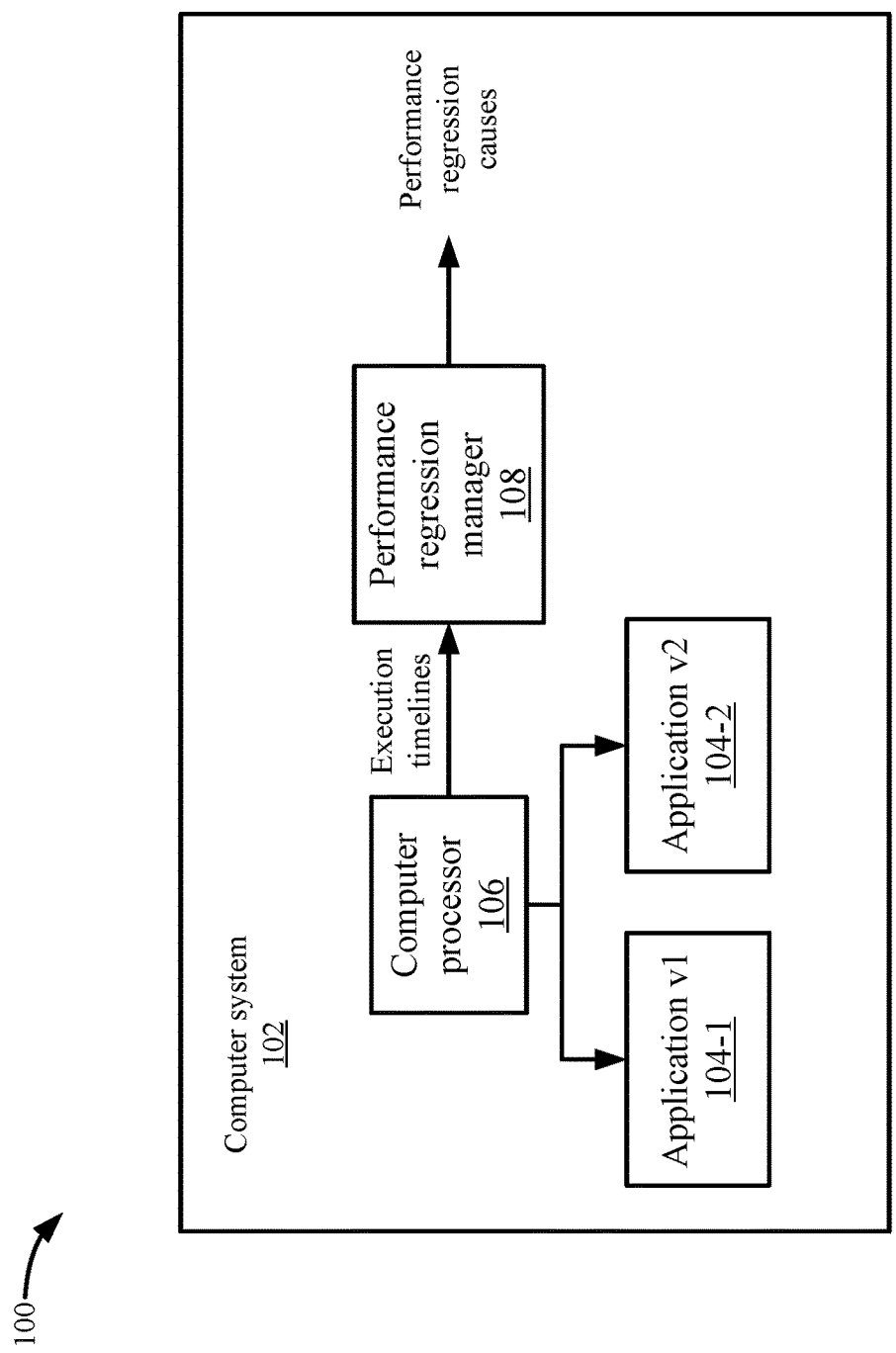
FIG. 1 depicts a simplified system for performing a performance regression analysis according to some embodiments.

FIG. 1 depicts a simplified system 100 for performing a performance regression analysis according to some embodiments. System 100 includes a computer system 102, which may include one or more computing devices. It will be understood that the functions described may be distributed among multiple computing devices or may be performed on a single computing device.

Computer system 102 includes a computer processor 106 that is configured to execute software code. For example, computer processor 106 may execute software code for an application 104. In some examples, different versions of application 104 may be tested in a performance regression test, such as an application version 1 (v1) 104-1 and an application version 2 (v2) 104-2. Application v1 104-1 may be different from application v2 104-2. For example, some software code may be changed in application v2 104-2. Although two versions are described, it will be understood that more than two versions may be tested.

From the execution of application v1 104-1 and application v2 104-2, execution timelines are generated. For example, different execution timelines are generated using the different versions of the application when interacting with a web application. For the execution timeline, computer system 102 performs an execution trace, which may record a series of function calls that form call trees from the functions that are executed by the application. In some embodiments, the call trees include function calls, such as asynchronous function calls (e.g., not called at the same time), that executed during a series of user interactions with the application. The series of user interactions may include any method of interaction with the application's interface (e.g., clicks, hovers, scrolls, etc.).

The call tree may include a top-level function as a starting point of the call tree in the execution trace. The execution trace may also contain multiple call trees so there can be also multiple top-level functions that are executed in an order in the execution trace. For example, the execution timeline is a tree, such as a tree T(V, E) whose descendants form the call trees in the execution trace, where V is the set of all nodes in the tree and E is the set of all edges connecting the nodes in the tree. Therefore, tree T is rooted at a node $r \in V$ whose children represent the top-level functions of each call tree. In addition, each node $v \in V$ in the call trees are labeled with the following:

v.name: the function name;
v.component: the component name (e.g., the file name);
v.time: the total response time; and
v.children: an array of v's child nodes ordered by the time of execution (e.g., timestamp).

For the root node $r \in V$, r.name and r.component are both left blank. The label r.children contains the top-level functions of the call trees and r.time is defined to be the sum of the response times of all the top-level functions.

Performance regression manager 108 analyzes the execution timelines and generates performance regression causes. A performance regression cause represents lowest-level functions that regressed by at least a real number u (e.g., a minimum response time difference u) based on a comparison of the old execution timeline (older application version) and the new execution timeline (newer application version). For example, given a real number u>0, an old timeline $T_{old}$ ($V_{old}$, $E_{old}$), and a new timeline $T_{new}$ ($V_{new}$, $E_{new}$), the performance regression cause is a node $v_{new} \in V_{new}$, which satisfies the following three conditions. First, either $v_{new}$ has a matching node $v_{old} \in V_{old}$ and $v_{new}$.time−$v_{old}$.time>=u (or $V_{new}$ does not have a matching node in the old timeline and $V_{new}$.time>=u). Second, the ancestor nodes of $V_{new}$ had matching ancestor nodes in the old timeline and for each matching ancestor node $A_{new}$ and $A_{old}$, $A_{new}$.time−$A_{old}$.time>=u. Third, if $V_{new}$ has a matching node $v_{old} \in V_{old}$, then for each matching child node $C_{new}$ and $C_{old}$ of $V_{new}$ and $V_{old}$, respectively, $C_{new}$.time−$C_{old}$.time<u. Further, for any child node $C_{new}$ of $V_{new}$ with no matching node in the old timeline, $C_{new}$.time<u. In summary, the performance regression causes are defined to pinpoint the lowest-level functions based on the comparison of the execution timelines. The first condition determines a matching node in both timelines that has an execution time difference greater than the minimum response time difference u. The second condition makes sure all the matching nodes above the node have an execution time difference greater than the minimum response time difference u. The third condition makes sure all the matching nodes below the node do not have an execution time difference greater than the minimum response time difference u. This makes sure that the node identified is the lowest level node with an execution time difference greater than the minimum response time difference u. These lowest-level functions may either contain code changes introducing the performance regression causes themselves or provide a strong lead to localize the changes that caused the performance regression.

Performance Regression Analysis

Figure 2:
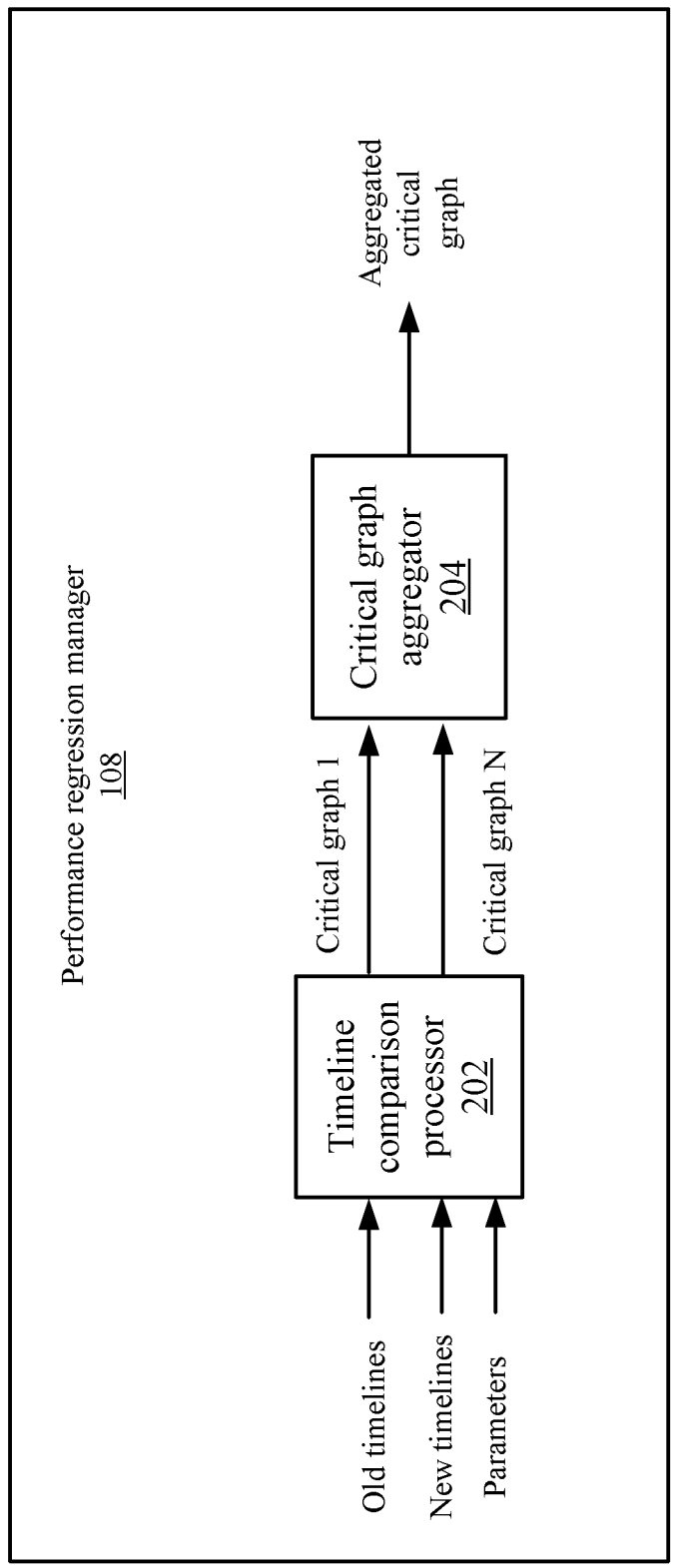
FIG. 2 depicts a more detailed example of a performance regression manager according to some embodiments.

FIG. 2 depicts a more detailed example of performance regression manager 108 according to some embodiments. A timeline comparison processor 202 receives the old timelines, new timelines, and a set of parameters. The set of old timelines $S_{old}$ are execution timelines from application v1 104-1. A set of new timelines $S_{new}$ are execution timelines from another version of the application, such as application v2 104-2. The set of parameters may include a real number u, which indicates the minimum difference in response time between matching nodes that is considered a significant regression. In some embodiments, the number of timelines in $S_{old}$ is equal to the number of timelines in $S_{new}$.

Timeline comparison processor 202 compares pairs of execution timelines one by one with each pair including an old timeline and a new timeline. The output of timeline comparison processor 202 is a set of critical graphs C (critical graphs 1 . . . N), where one critical graph is generated for each timeline pair compared. A critical graph represents a new timeline, but with nodes that are considered irrelevant to the performance regressions being filtered out. The critical graph therefore provides a summary of all the performance regression causes when comparing the old and new timelines as call trees of each of the performance regression causes. The call trees are the function calls that lead to the performance regression causes. For example, given a real number u>0, an old timeline $T_{old}$($V_{old}$, $E_{old}$), and a new timeline $T_{new}$($V_{new}$, $E_{new}$), a subtree $T_{sub}$($V_{sub}$, $E_{sub}$) of $T_{new}$ is a critical graph if and only if the set of all the leaves in $T_{sub}$ is the same as the set of all performance regression causes in $T_{new}$.

A critical graph aggregator 204 receives the critical graphs and aggregates the critical graphs. The aggregation accounts for variance in the performance numbers by aggregating the results of multiple pairs of execution timelines. The aggregation automatically identifies performance regression causes based on a direct comparison of multiple pairs of execution timelines. A final output of critical graph aggregator 204 is an aggregated critical graph that takes into account the results of all the timeline pair comparisons. The aggregated critical graph identifies the performance regression causes.

Figure 3A:
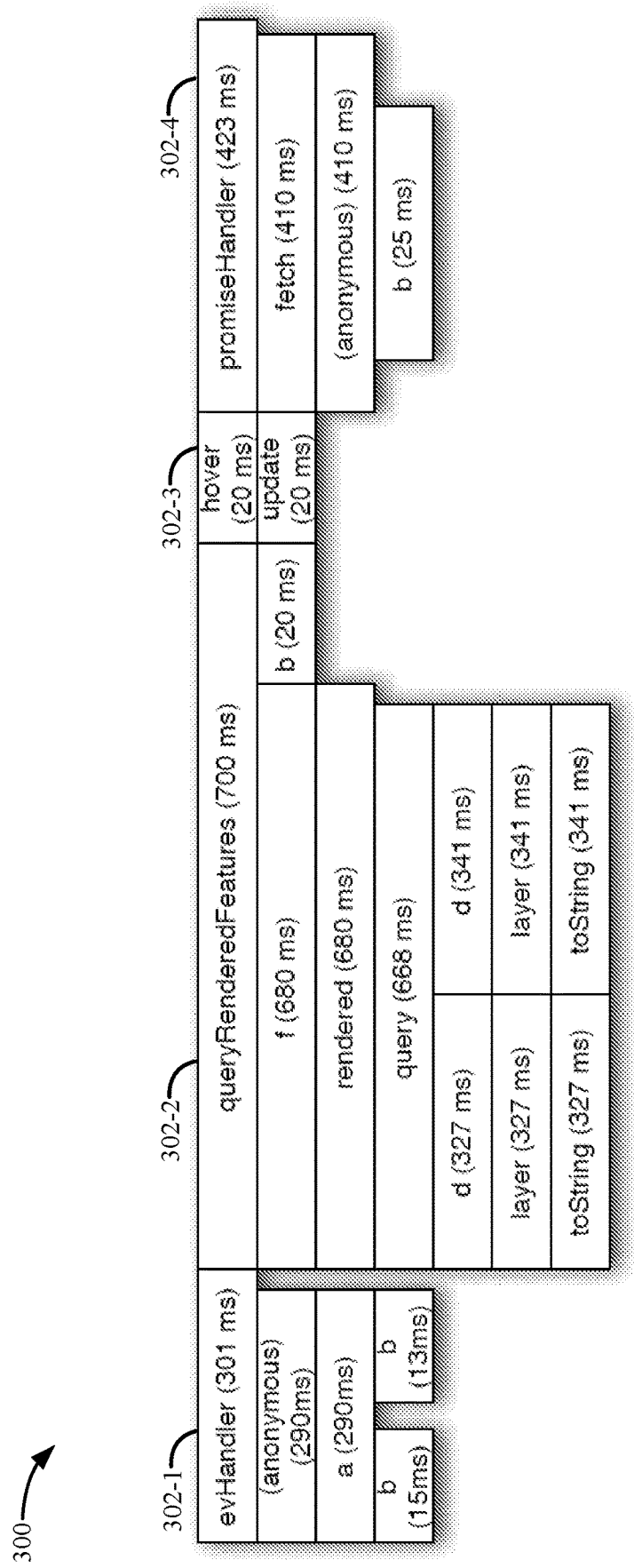
FIG. 3A shows an old execution timeline according to some embodiments.

The following shows an example of execution timelines, critical graphs, and an aggregated critical graph. FIG. 3A shows an old execution timeline 300 according to some embodiments. The execution timeline provides information on the functions that are executed at runtime and the time it took each function to execute (e.g., the response time). Although response time is used, other performance metrics may be used, such as CPU usage and memory usage. Execution timeline 300 is generated from an application version that is before the performance regression was introduced.

In some embodiments, the example is based on a performance regression observed in a web application. In execution timeline 300, four separate asynchronous function calls 300-1 to 302-4 are called during execution: evHandler at 302-1, queryRenderedFeatures at 302-2, hover at 302-3, and promiseHandler at 302-4. These functions are top-level functions and the rectangles below each of the asynchronous function calls represent a call tree. For example, the function queryRenderedFeatures called both functions f and b. In turn, function f called function rendered, which in turn called function query, and so on. The numbers in parentheses represent the response times of each function. In general, the response time of a function includes both the self-time (e.g., the amount of time taken executing code within the function itself) and the total time it took to execute the functions that were called by the function.

Figure 3B:
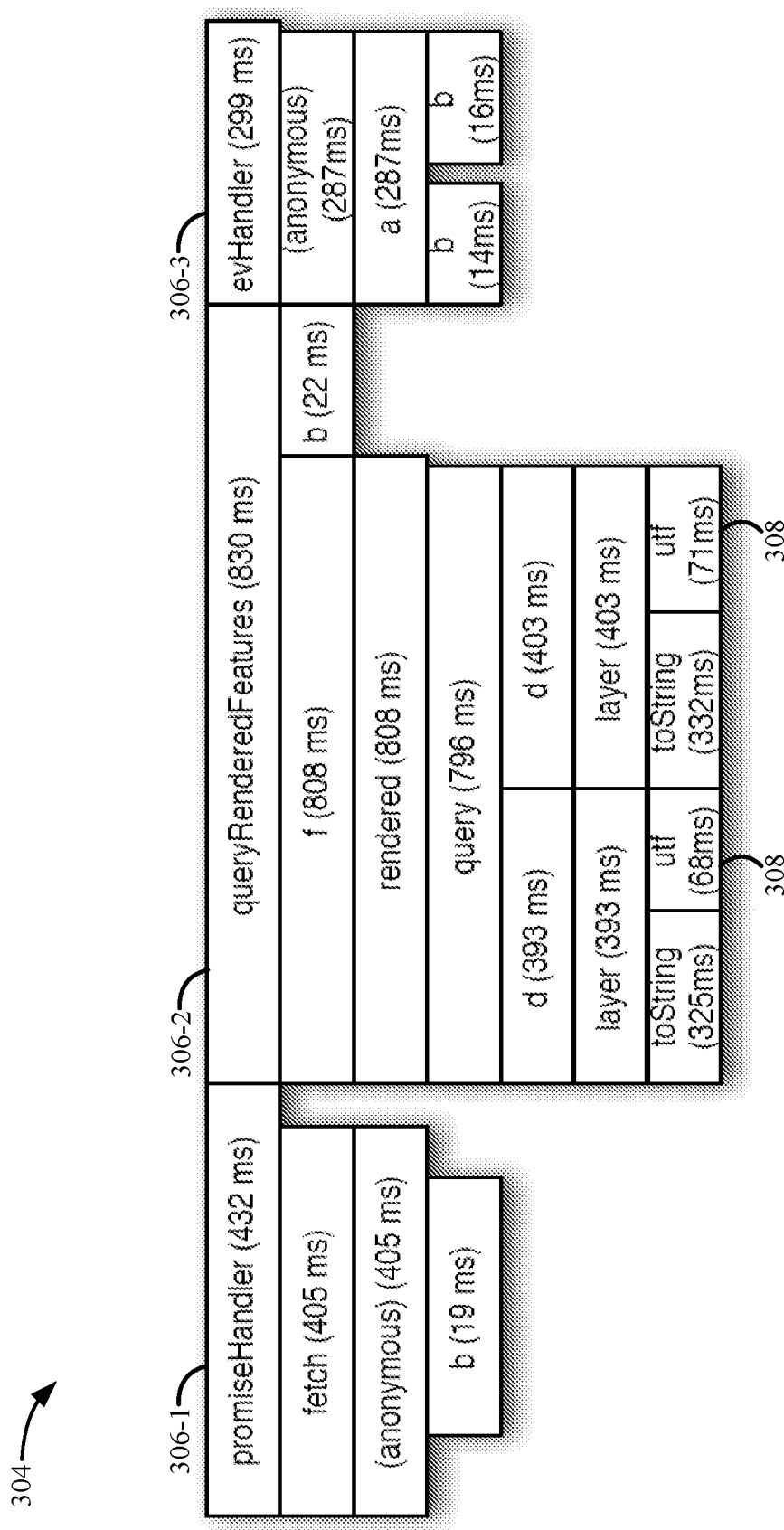
FIG. 3B depicts a new execution timeline according to some embodiments.

FIG. 3B depicts a new execution timeline 304 according to some embodiments. Timeline 304 includes three asynchronous function calls 306-1 to 306-3: promiseHandler, queryRenderedFeatures, and evHandler. The function call hover did not execute in the new execution timeline. Additionally, the order in which the asynchronous function calls were executed is also different in new timeline 304 compared with old timeline 300. For example, the function promiseHandler is executed before the function queryRenderedFeatures in new timeline 304 while the function promiseHandler is executed after the function queryRenderedFeatures in old timeline 300. Also, the function evHandler is executed after the function queryRenderedFeatures in new timeline 304 while the function evHandler is executed before the function queryRenderedFeatures in old timeline 300. Finally, new function calls to the function utf are made by the function layer found underneath the function queryRenderedFeatures at 308.

In the comparison of new timeline 304 and old timeline 300, the largest performance regression among the asynchronous function calls may be in the function queryRenderedFeatures, which slowed down by 130 milliseconds (ms). The functions evHandler and promiseHandler actually performed better in new timeline 304; however, these functions could have regressed in other examples. Looking at the queryRenderedFeatures function, the function calls to function d and the function layer slowed down by about 70 ms. As the timelines show, the reasons these functions slowed down is that the function layer makes a new call to the function utf that takes 70 ms to execute. Therefore, these new calls to the function utf are the ones that appear to introduce the performance regression.

Identification of the function utf as the performance regression cause may allow a user to search for the software commit that added the new function calls to utf in the source code, which would help the user who developed the change further localize the regression at the source code level and eventually come up with a fix to the regression. The above performance regression cause may be simplified in this example, but even in the simplified execution timelines, the difficulties in analyzing and comparing them manually can be appreciated. For example, the fact that some asynchronous function calls execute in different orders makes it difficult to visually match which calls in the old timeline 300 correspond to calls in the new timeline 304. Further, even if looking ahead and noticing that the new calls to function utf are being made at the bottom of the execution timeline, the user cannot immediately assume that these calls introduced the performance regression. This is because higher-level functions may also have seen performance improvements that might offset the additional time taken by the new function calls, which would indicate that the overall performance regression is introduced elsewhere. Therefore, determining the lowest-level function that introduced the regression presupposes finding the path to this function; in other words, when drilling down on the function queryRenderedFeatures, for example, it is necessary to analyze the functions one level at a time, which is tedious as the user would have to constantly switch back and forth between looking at the old timeline 300 and the new timeline 304. Further, these timelines may be simplified from the real world and full timelines generated from real world web applications may be much bigger and much more complicated with hundreds of asynchronous calls and thousands of function calls in total. Additionally, because the regressions are looked at in the granularity of milliseconds, pinpointing the root cause will be very difficult to do by simply visually looking at the timelines.

Accordingly, some embodiments perform the analysis by determining pairs of matching functions in the execution timelines. These pairs are determined even considering some top level functions may change in order or new functions may be introduced. The pairs of matching functions are then used to determine the critical graphs. The use of the pairs of matching functions allows the performance regression analysis to be performed automatically with accurate results as will be described below.

One of the challenges in automating the comparison of execution timelines is that additional function calls may be added and the order of function calls may change from one version to another. These changes occur both as a natural by-product of the changes made to the source code of the application and, in the case of web applications, as a result of the asynchronous and event-driven nature of the software code (e.g., a user interacts with the application differently causing different functions to be executed). As a result, inferring the matching nodes between execution timelines may be difficult, as a simple sequential mapping of the nodes based on the order of the function calls at each level of the call tree may not suffice.

Another complication is introduced because execution timelines may be very noisy, such as the execution timelines may include many function calls that are irrelevant to the performance regression. This issue is present in web applications due to extraneous event handlers that may be triggered by the user while interacting with the application, such as in the case of the function hover in execution timeline 300 in FIG. 3A. The versions of the application may often encompass multiple commits and since performance regression tests may often be done not on a per-commit basis but after several commits, because performing performance regression tests every commit may be unfeasible given the amount of time it takes to run performance tests (e.g., hours) and the frequency of commits (multiple commits per hour). The multiple commits in between regression tests makes the execution timelines more susceptible to noise given the number of changes that are likely unrelated to the performance regression.

Finally, performance varies from execution to execution, which adds further noise to the execution timelines. Thus, a comparison of an old timeline and a new timeline may show extraneous performance regressions that may not appear in other timeline pairs. As a result, multiple pairs of timelines often need to be generated and compared, which may require aggregation of the results from each comparison.

The following will now describe the timeline pair comparison and then the critical graph aggregation in more detail.

Timeline Pair Comparison

Timeline comparison processor 202 may compare pairs of execution timelines one by one with each pair including an old timeline and a new timeline. Timeline comparison processor 202 may perform two processes: a first process findCriticalGraph that traverses the timeline pairs to filter out nodes that are irrelevant to the performance regression as well as some non-useful nodes (e.g., nodes that may mislead the analysis and are therefore susceptible to generating false positives). Timeline comparison processor 202 also includes a second process findMatchingNodes that tries to infer matching nodes among a list of nodes in a same tree level in the execution timeline pairs. Two nodes coming from different timelines are considered to be in the "same level" if their parent nodes have been determined as matching nodes by the findMatchingNodes function. In the base case, all the top-level nodes are considered to be at the "same level", and from there, the function proceeds to find matching nodes recursively. In some examples, a node A in the new timeline is considered to match a node B in the new timeline if (1) the nodes are called by the same function P, (2) the nodes correspond to the same function call made by the function P in the source code, and (3) the nodes are in the "same level". In some examples, the ancestor nodes of the parent nodes may be different in the two timelines, but the nodes may still be considered matching nodes. As discussed above, timeline comparison processor 202 outputs a set of critical graphs C where one critical graph is generated for each timeline pair compared.

Figure 4:
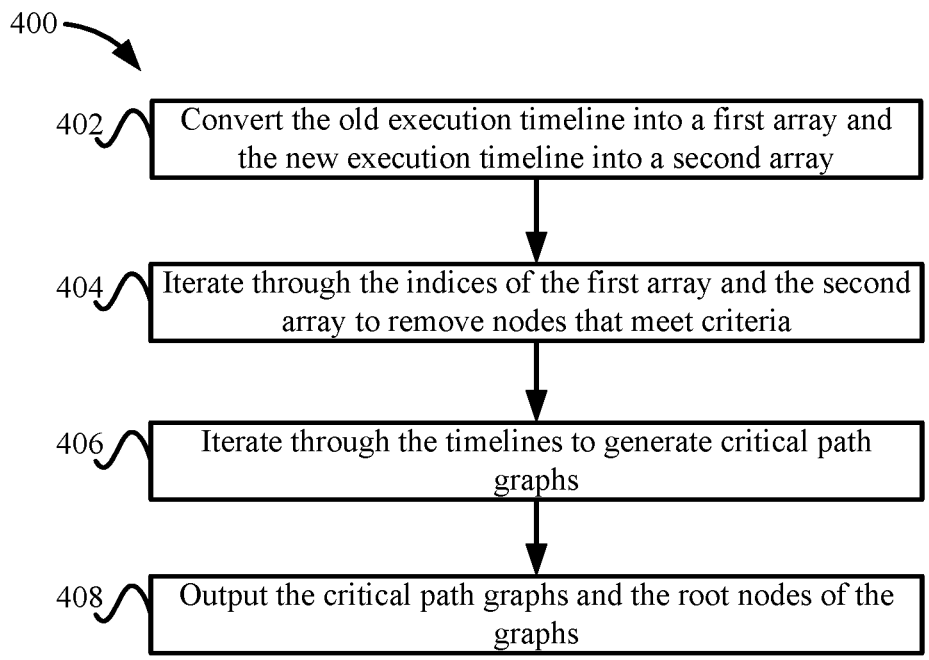
FIG. 4 depicts a simplified flowchart of a method for performing the timeline pair comparison according to some embodiments.

FIG. 4 depicts a simplified flowchart 400 of a method for performing the timeline pair comparison according to some embodiments. Timeline comparison processor 202 receives the set of execution timelines and the minimum response time difference u, and at 402 converts the old execution timeline into a first array and converts the new execution timeline into a second array, arrays $A_{old}$ and $A_{new}$, respectively. One purpose of using the arrays is to assign an order in which the timelines are compared and to the pairings.

In some embodiments, an algorithm 1 of compareTimelinePairs is used by timeline comparison processor 202 to perform the analysis. FIG. 5 depicts an example 500 of algorithm 1 according to some embodiments. Algorithm 1 receives as input the set of execution timelines and the minimum response time difference u. Line 1 initializes the set of critical graphs C that will be output. Lines 2 and 3 generate the arrays $A_{old}$ and $A_{new}$ using a function toArray. The function toArray pairs the old timeline from index I in array $A_{old}$ (denoted by $A_{old,I}$) with the new timeline from index I in array $A_{new}$ (denoted by $A_{new,I}$). These timelines are compared and the total number of comparisons is equal to the number of old timelines provided as input, which itself is equal to the number of new timelines provided as input. The timelines may be ordered alphabetically based on the name of the file containing the timeline data. However, the timelines may be paired in different ways.

Referring back to FIG. 4, at 404, timeline comparison processor 202 iterates through the indices of the first array and the second array to remove nodes that meet a criterion or criteria. In FIG. 5, lines 4-9 iterate through the indices of the arrays $A_{old}$ and $A_{new}$. In each iteration, timeline comparison processor 202 first takes the execution timelines in the ith position of each array (e.g., array $A_{old,i}$ and array $A_{new,i}$) and passes the execution timelines as input to a function pruneTree in line 5. The function pruneTree removes timeline nodes whose name meets a first criterion, such as the name is blank, "(anonymous)", or a second criterion, such as the name includes only a single character. A blank name may be no name at all or may be an identifier that indicates the name is blank, such as the word "anonymous". Nodes representing anonymous functions may be removed from the timeline as these functions often provide little valuable information to a user and, more importantly, the functions make the approach more susceptible to false positives since the approach might mistake two different anonymous functions to be the same given that they have the same value for the name. Also, nodes with single character names may also be removed since they often represent the minified names assigned to some functions, which often change from commit-to-commit. The minification of a name may abbreviate the name, such as with a single character. Whenever a node V is removed from an execution timeline, the parent of the node V becomes the parent of the children of node V.

Figure 8A:
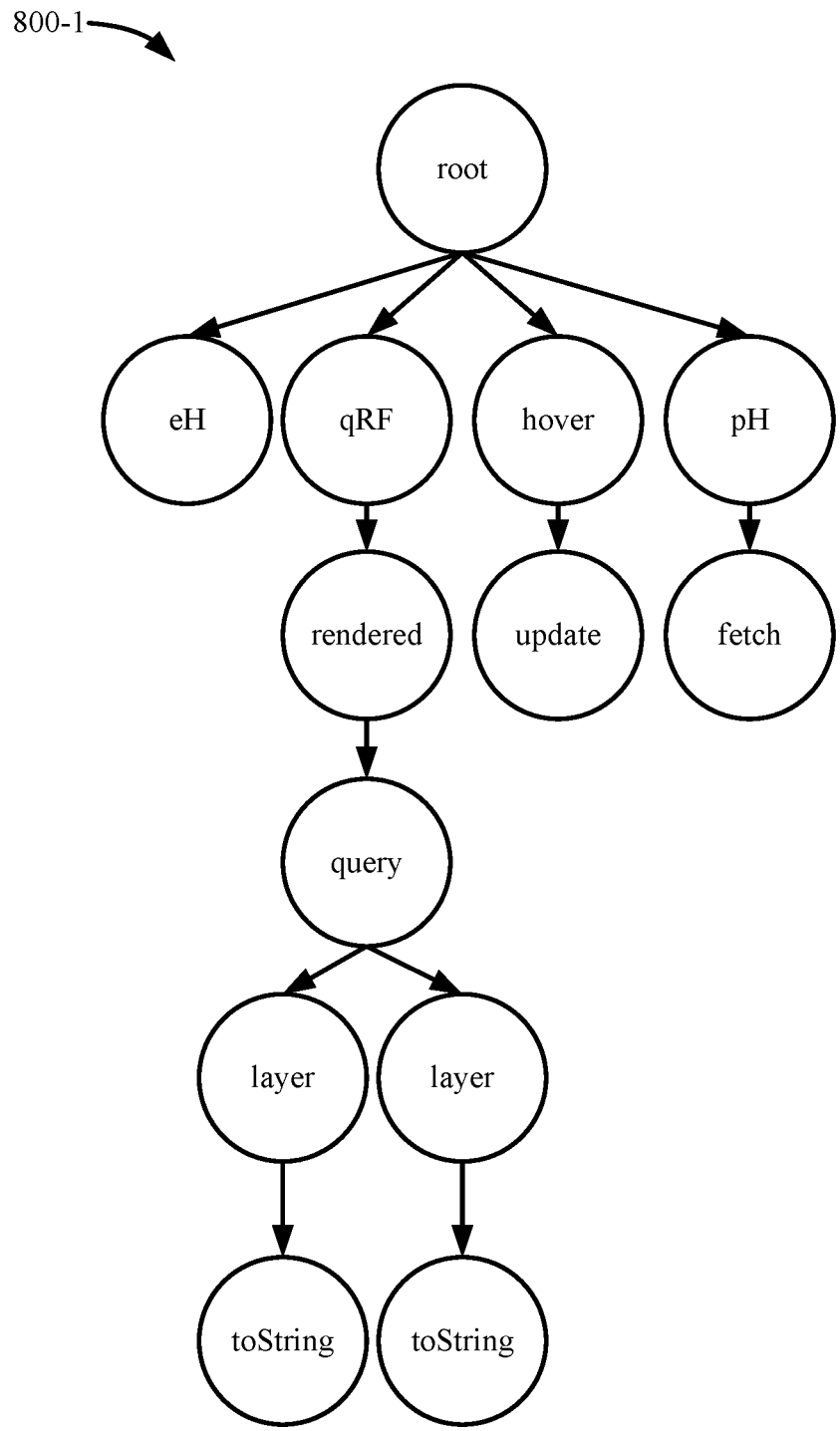
FIGS. 8A and 8B depict pruned timelines according to some embodiments.
Figure 8B:
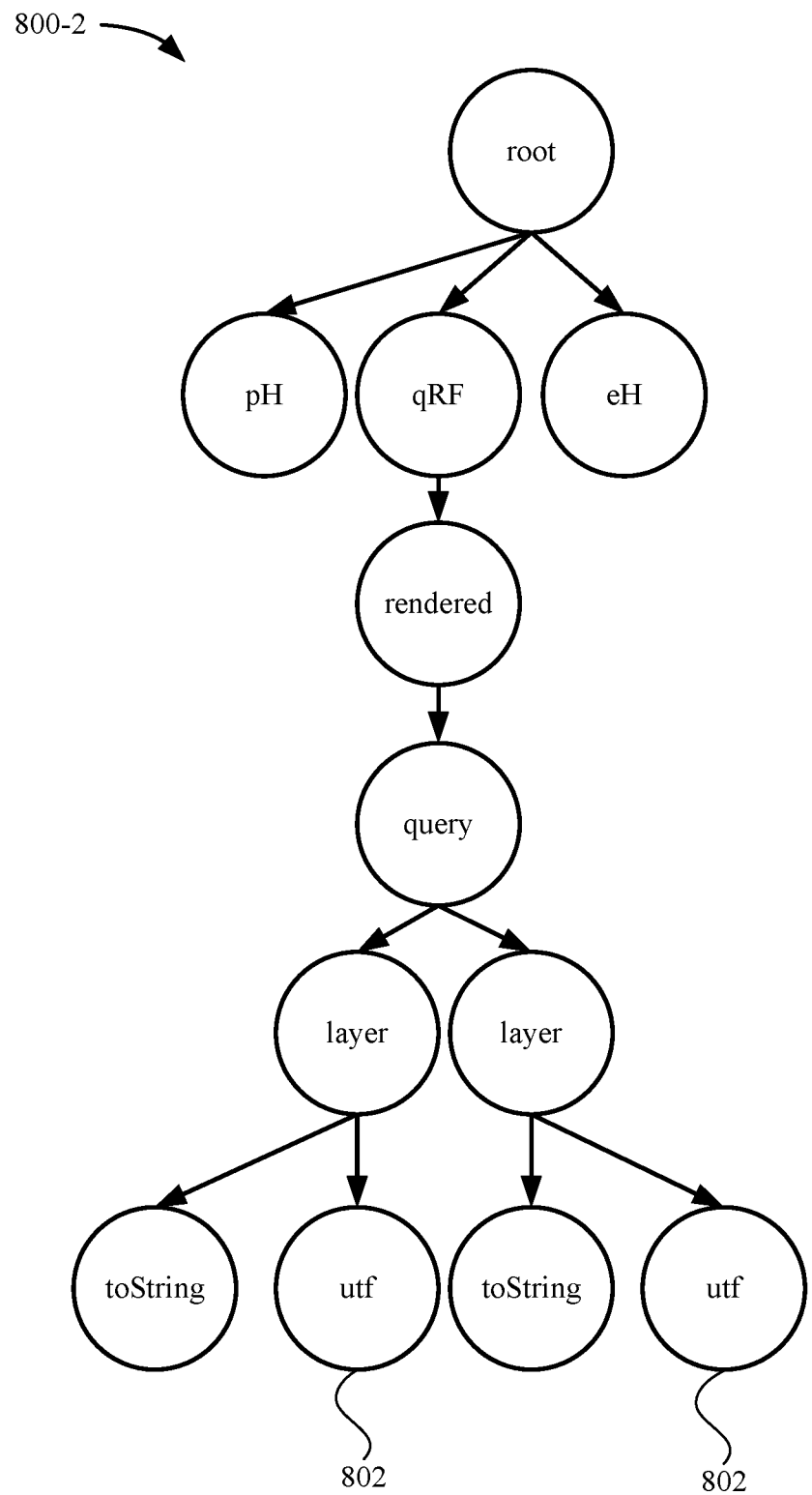

FIGS. 8A and 8B depict pruned timelines 800-1 and 800-2 according to some embodiments. An old pruned timeline 800-1 is output by line 5 of the function compareTimelinePairs for an old execution timeline and a pruned timeline 800-2 is output by line 6 of the function compareTimelinePairs for a new execution timeline. In the figures, some of the function names have been abbreviated. For example, eH refers to the function evHandler, qRF refers to the function queryRenderedFeatured, and pH refers to the function promiseHandler. The pruned timelines show the dependencies between functions. For example, in FIG. 8A, for the function evHandler (eH), the functions anonymous, A, B, and D were removed from the old timeline. Reasons for their removal may include the functions were anonymous or a single letter. For the function queryRenderedFeatures (qRF), the functions f, b, and d were removed. Also, for the function promiseHandler (pH), the functions anonymous and b were removed.

For the pruned new timeline in FIG. 8B, for the function promiseHandler (pH), the functions anonymous and b were removed. For the function qRF, the functions f, b, and d were removed; for the function evHandler, the functions anonymous, a, b, and d were removed. As shown in FIG. 8B, at 802, the function utf is included, which is not included in the pruned old timeline shown in FIG. 8A.

Figure 9:
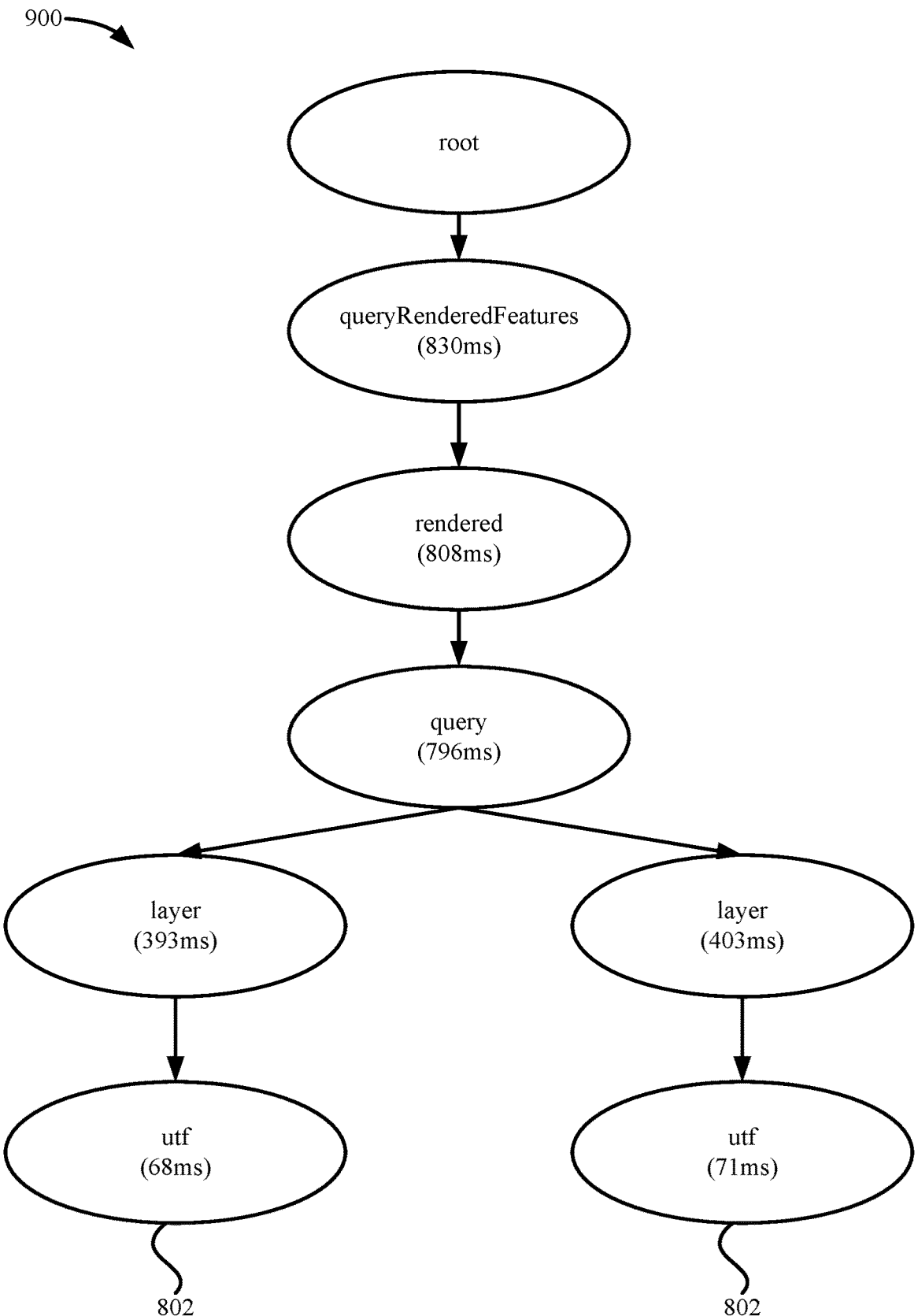
FIG. 9 depicts a critical graph according to some embodiments.

Referring back to FIG. 4, at 406, timeline comparison processor 202 iterates through the timelines to generate critical path graphs. Referring back to FIG. 5, the calls to the function pruneTree return the roots of the pruned execution timelines. The roots $R_{old}$ and $R_{new}$ of the pruned trees are input to a function findCriticalGraph in line 7, which compares the two pruned timelines to which these roots correspond, and calculates the critical graph for this comparison. Each critical graph generated from each comparison is placed in the set of critical graphs C in line 8, which is the output of the comparison. FIG. 9 depicts a critical graph 900 according to some embodiments. The critical graph follows the call path to the performance regression causes. For example, the performance regression causes are shown at 802, and the call graph of functions needed to reach the performance regression causes is depicted in critical graph 900. For example, the call graph goes from the functions root, queryRenderedFeatures, rendered, query, and layer to the functions utf. Referring back to FIG. 4, at 408, timeline comparison processor 202 outputs the critical path graphs and the root nodes of the critical path graphs.

Before discussing the critical path aggregation, the function findCriticalGraph that is found in line 7 of the compareTimelinePairs function in FIG. 5 will be now be described in more detail. FIG. 6 depicts an algorithm #2 of the function findCriticalGraph 600 according to some embodiments. The function findCriticalGraph is a recursive function that receives three inputs: (1) a pair of nodes ($R_{old}$, $R_{new}$); (2) the minimum response time difference u; and (3) a variable useAlternate that is used by the function findMatchingNodes that will be described later. The function findCriticalGraph assumes that the pair of nodes ($r_{old}$,$r_{new}$) represents matching nodes and the function findMatchingNodes decides which nodes are matching. In line 1, the function findCriticalGraph creates a new graph that is initialized with only one node, a root node $r_G$ that is a copy of the node $r_{new}$ in lines 1-3. Then, the function findCriticalGraph invokes the findMatchingNodes algorithm, which outputs an array M of node pairs, with each pair representing matching nodes between the children of node $r_{old}$ and the children of node $r_{new}$ in line 4 where the response time difference is at least the minimum response time difference u. This determines pairs of nodes where a node has its performance regress by more than u. For some node pairs ($v_{old}$,$v_{new}$) in array M, the value $v_{old}$ may be null; the condition under which such pairs are included in the array will be described below.

In lines 5-18, a FOR loop iterates through each pair of matching nodes ($v_{old}$,$v_{new}$) in array M. For each of these pairs, the function findCriticalGraph encounters two possible scenarios depending on the value of node $v_{old}$. In particular, if node $v_{old}$ is null, this indicates that the node $v_{new}$ represents a new function call with a response time of at least the minimum response time difference u that is present in the new timeline, but was not present in the old timeline. This is therefore a performance regression because the new function call is causing some performance regression over the value of u. As a result, $v_{new}$ is added as a child of group node $R_G$ in lines 8-10 and no further exploration is needed or performed by the function findCriticalGraph.

On the other hand, if node $v_{old}$ is not null, then node $v_{old}$ and node $v_{new}$ represent matching nodes where node $v_{new}$'s response time is slower than node $v_{old}$'s response time by at least the minimum response time difference u. In this scenario, the function findCriticalGraph is recursively called with ($v_{old}$, $v_{new}$) as input in line 12 to determine if there are any matching descendent nodes whose response times differ by at least the minimum response time u. The root node resulting from this recursive call is added as a child of root node $R_G$, and the recursion halts once a performance regression cause is encountered (e.g., there are no longer any matching descendent nodes whose response times differ by at least the minimum response time difference u). This process is proceeding down the call tree to find node pairs that have performance differences greater than the minimum response time difference u until a pair is found that does not have a difference greater than the minimum response time difference u or there are no further pairs to analyze. By the end of the algorithm, the graph G would include the nodes that lead up to the performance regression causes and is a critical graph. The recursive calls in the function findCriticalGraph improve the generation of the critical graphs because the recursion can traverse the execution timelines to determine descendant nodes. Also, the findCriticalGraph function is able to prune out significantly large portions of the timeline by performing a depth-first traversal of two trees from the execution timelines at the same time. This is faster than having to look back and forth at the two timelines to compare the response times. The computing system is able to quickly fetch the response time information from memory and do the same comparison instantly.

The findMatchingNodes algorithm that is called by a findMatchingNodes function in line 4 of the function findCriticalGraph will now be described. FIG. 7 depicts an example of the findMatchingNodes algorithm 700 according to some embodiments. The function findMatchingNodes receives as input: (1) a pair of arrays ($B_{old}$, $B_{new}$), where the arrays contain the nodes that need to be matched; (2) the minimum response time difference u; and (3) a value, such as the Boolean value, for a variable useAlternate, which forces the algorithm to use the "alternate matching algorithm" described below. The output is an array M of matching node pairs ($v_{old}$,$v_{new}$), where a node $v_{old}$ may be null as discussed above.

In line 1, the function findMatchingNodes begins by initializing the array M. The function findMatchingNodes then invokes the main matching algorithm used, which finds the longest common subsequence (LCS) when comparing two arrays in line 2. The longest common subsequence between two arrays may be defined as the longest sequence of values found in both arrays, where the values in the sequence are not necessarily positioned consecutively in either array. That is, in the first array, the nodes may be in positions 3-7 and in the second array, the nodes may be in positions 10-14. In line 2, the longestCommonSubsequence call returns a pair of arrays (J,K) where J and K contain the indices of the matching nodes in array $B_{old}$ and array $B_{new}$, respectively. For example, if the first element of array J is 5 and the first element of array K is 7, then the fifth element of array $B_{old}$ and the seventh element of $B_{new}$ have been identified as matching nodes. The same principle applies to the second element of array J and array K, the third element, the fourth element, and so on. Although the first matching algorithm of LCS is used, other algorithms may be used. However, LCS preserves the order in which the functions are called even in cases where the same function is called in multiple, non-consecutive instances and considers the possibility of function calls being added or removed across versions. However, the LCS problem is applied to arrays with arbitrary lengths and values and may be nondeterministic polynomial time (NP)-complete, and the speed of the algorithm depends on the values of the arrays and the arrays' sizes. That is, although a solution to the NP-complete problem can be verified quickly (in polynomial time), there may be no known efficient way to locate a solution. The NP-complete problems may not have a fast solution to them that is known. That is, the time required to solve the problem using any currently known algorithm increases very quickly as the size of the problem grows. As in the case of execution timelines, function calls in the same level of the timeline tend to follow more or less the same sequence from version to version with only slight alterations that are mostly due to the function calls that have been added or removed. In these cases, the LCS algorithm may execute quickly. However, there may be cases where some functions are re-factored to the point that the function call sequence becomes drastically different, and the LCS algorithm may not scale well when encountering such situations. Additionally, the order of execution for the top-level functions often changes, as is the case where the function evHandler and promiseHandler functions executed in different orders in FIGS. 2A and 2B. This re-ordering may also make the LCS algorithm execute slowly because the other functions are reviewed first before reviewing the correct function in the execution timeline.

To account for the above scalability issue, the function findMatchingNodes uses another alternate matching algorithm in lines 3-22. The alternate matching algorithm may be more scalable than the LCS algorithm. For example, the alternate matching algorithm may only consider the order of the functions with the same component and name, and not the overall order of the functions. The LCS algorithm is a recursive algorithm that compares the arrays element by element; when matching elements are encountered in the algorithm such that the longest sequence known so far is extended, the algorithm recursively compares the remaining parts of the arrays to see if the sequence can be extended further. On the other hand, the alternate matching algorithm is an iterative algorithm that groups nodes by function name. The groups sharing the same function name are the ones that are compared. Nodes that are positioned in the same index in the same group are considered matching nodes; excess nodes are considered unmatched nodes. Further, the alternate matching function may only execute under two conditions. First, the alternate matching function executes when matching top-level functions of the execution timeline. For example, when function compareTimelinePairs in algorithm 1 of FIG. 5 sets the value of useAlternate to true when calling function findCriticalGraph because the top-level functions were being compared (as discussed above the top level functions often change in the order of execution and the LCS analysis may execute slowly). Whereas the recursive call to the function findCriticalGraph in algorithm 2 in FIG. 6 set the value of the variable useAlternate to false because these were not top-level functions being compared. Second, the alternate matching algorithm also executes when the execution timeline of the LCS algorithm exceeds a threshold. At this point, array J and array K are both set to null. The recursive calls in both the function findCriticalGraph and the LCS algorithm introduce two levels of recursion. The two levels allow timeline comparison processor 202 to extend the matching pairs efficiently while still allowing for using an alternate algorithm when the time taken exceeds a threshold. The analysis uses two levels of recursion to increase the speed of the analysis. Further, using these levels of recursion would not be feasibly possible to perform manually within a time limit needed. Further, the use of the time threshold allows the function to use one algorithm, but switch to another algorithm when the time taken exceeds a threshold. The use of two algorithms balances accuracy versus performance.

The alternate matching algorithm sets the values of the arrays J and K in a way similar to the LCS algorithm. After initializing the values of these arrays to empty arrays in line 4, the alternate matching algorithm iterates to the nodes in array $B_{old}$ and places the index that the node appears in array $B_{old}$ in a hash map $hm_{old}$ in lines 6-12. The hash map keys are defined by the component and the function name of the node, and the hash map values are arrays of integers containing the indices to array $B_{old}$. Once the hash map has been populated, the alternate matching algorithm iterates through the nodes in array $B_{new}$ in lines 13-21. If a node's component and function name matches a key in the hash map, the index of that node in array $B_{new}$ is added to the array K, and the matching index from the hash map is added to the array J. This process continues until all nodes in array $B_{new}$ have been analyzed.

Once the arrays of indices J and K have been populated either by the LCS algorithm or the alternate matching algorithm, lines 23-34 iterate through the indices of the array $B_{new}$ and adds pairs of matching nodes to the output array M. In each iteration, the algorithm determines whether the current index i is in array K. If so, it retrieves the index, kIndex, in which the value I appears in array K in line 26. Then, the code subsequently retrieves the index value that appears in the kIndexth position of both array J and array K. These index values are then used to retrieve the corresponding matching nodes from array $B_{old}$ and array $B_{new}$, respectively, and these matching nodes are added as a pair to array M if the difference in response time is at least the minimum response time difference u in line 29. On the other hand, if the value i does not appear in array K, this would indicate that the corresponding node in array $B_{new}$ has no matching node in array $B_{old}$. The node is still added as a pair to array M if its response time is at least the minimum response time difference u, albeit it is paired with the null value in line 32. The null value indicates that there is no matching node in array $B_{old}$. That is, this function is a new function that is executed.

Referring the FIGS. 8A and 8B, one process of finding the matching pails will be described. The discussion assumes all nodes had a performance difference of u, but that may not always be the case. If the pair of nodes did not have a difference of u, then the pair may not be added. In FIG. 8A, timeline comparison processor 202 analyzes the top-level functions, which are expected to be out-of-order and will therefore default to the alternate matching algorithm (e.g., timeline comparison processor 202 will not execute LCS for these top-level functions due to the useAlternate flag being set). If LCS were applied to this specific example, the LCS algorithm finds that the longest common subsequence is only one element long, containing only qRf. As a result, the LCS algorithm will successfully determine that the qRf nodes are matching nodes, but the LCS algorithm will ignore the pH nodes. In contrast, if the alternate matching algorithm were used, the alternate matching algorithm groups the nodes according to the function name, and then the alternate matching algorithm finds matching nodes by comparing groups corresponding to the same function name; therefore, the alternate matching algorithm finds nodes eH, qRf and pH as matching nodes.

Next, for nodes that do not correspond to top-level functions, these nodes are generally not expected to be out of order, so the LCS algorithm is used by default and the useAlternate flag may not be typically set. However, in the event that large changes are made from one version of the application to another, the LCS algorithm may take a long time to execute. In such a scenario where LCS is taking longer than a threshold, the alternate algorithm is used.

Critical Graph Aggregation

As discussed above, timeline comparison processor 202 may generate a set of critical graphs. Critical graph aggregator 204 receives the set of critical graphs and aggregates the critical graphs to generate an aggregated critical graph that puts together the intermediate critical graphs generated by timeline comparison processor 202. In some examples, the aggregated critical graph includes all nodes that appear in all the intermediate critical graphs, and excludes all other nodes. However, if some nodes appear in critical graphs, such as in X percent (e.g., 80 percent) of the critical graphs, then the nodes may be aggregated into the aggregated critical graph. The aggregation attempts to decrease the number of false positives where a false positive refers to a function call that is reported as a performance regression cause, but is actually not a performance regression cause. Thus, the aggregation attempts to eliminate the noise often seen in execution timelines. For example, a critical graph that identifies a node as a performance regression cause that is not in any other critical graph may be a false positive.

The process for aggregating the two graphs may be similar to lines 3-22 of the function findMatchingNodes described in FIG. 7. When comparing each level of the critical graph, critical graph aggregator 204 first iterates through the nodes in that level from the first critical graph and stores the indices in a hash map. Afterwards, critical graph aggregator 204 iterates through the nodes from the second critical graph and whenever a node with the same component and function name is encountered based on the hash map, critical graph aggregator 204 adds that node to the aggregated critical graph. The subsequent pairs are then further explored recursively. Critical graph aggregator 204 performs the comparison for each subsequent critical graph. In other words, the first and second critical graphs are compared, which generates an aggregated critical graph; this aggregated critical graph is then compared with the third critical graph, which generates another aggregated critical graph; and so on, until all critical graphs have been included in the comparison. Critical graph aggregator 204 generates a large common sub tree among all critical graphs as the aggregated critical graph.

Conclusion

Some embodiments perform automated comparisons of execution timelines to determine performance regression causes. The pairs of execution timelines are received as input and performance regression manager 108 outputs an aggregated critical graph of the performance regression causes with the call graph to the causes. Some embodiments filter out false positives from the critical graphs using the aggregator, which achieves greater path precision as more timeline pairs are included as input. Also, some embodiments prune out irrelevant function nodes from the execution timelines, which speeds up the process of generating the critical graphs. The two levels of recursion that are required are implemented using the findCriticalGraph function and the LCS algorithm. The algorithms are configured to efficiently process the execution timelines and when the LCS recursion takes a time that is above a threshold, another alternate algorithm is used. This allows the analysis to be performed in a way that manually was not feasibly possible. Accordingly, some embodiments provide a method for automatically analyzing execution timelines while increasing the speed of execution.

System

FIG. 10 illustrates hardware of a special purpose computing machine configured with performance regression manager 108 according to one embodiment. An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable storage mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information through the network interface 1004 across a local network 1020, an Intranet, or the Internet 1030. In the Internet example, software components or services may reside on multiple different computer systems 1010, client 1015, or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, a plurality of execution timelines including nodes organized in a call tree representing function calls and execution times from executing a first version of an application and a second version of the application;

selecting, by the computing device, pairs of nodes from a first set of nodes from a first execution timeline in the plurality of execution timelines from the first version of the application and a second set of nodes from a second execution timeline in the plurality of execution timelines from the second version of the application, wherein the pairs of nodes include a same function call in both the first execution timeline and the second execution timeline or when the first execution timeline or the second execution timeline includes a node that is not found in the first execution timeline, wherein selecting the pairs of nodes comprises:

using, by the computing device, a first process to select pairs of nodes in the first set of nodes and the second set of nodes, the first process considering an overall order of the functions associated with the first set of nodes and the second set of nodes to select the pairs of nodes; and switching, by the computing device, to a second process to select pairs of nodes when a time to select the pairs meets a threshold, the second process not considering the overall order of the functions;

iterating, by the computing device, through the pairs of nodes to determine (1) whether a node in the second execution timeline is not included in the first execution timeline and has an execution time slower than a set difference; or (2) whether a first node in the second execution timeline has an execution time slower than a second node in the first execution timeline by the set difference, wherein the iterating stops when (1) is performed, and when (2) is performed, the iterating is recursively called to determine descendant nodes from any nodes in the pair of nodes where the first node in the second execution timeline has the execution time slower than the second node in the first execution timeline by the set difference, wherein the iteration is stopped when a further pair of nodes is found that does not satisfy the set difference;

adding, by the computing device, nodes that meet criteria of (1) or (2) during the iterating to generate a critical graph that defines a path of nodes that lead to a node that has been identified as a performance regression cause.

2. The method of claim 1, wherein the first set of nodes include one or more functions that are executed in a different order in the first call tree than the second set of nodes in the second call tree and the second set of nodes includes one or more functions that were not in the first set of nodes.

3. The method of claim 1, further comprising:

removing nodes in the first set of nodes or the second set of nodes that do not meet a criterion before selecting the pairs of nodes.

4. The method of claim 3, wherein functions with anonymous names are removed.

5. The method of claim 3, wherein functions that have single character names are removed.

6. The method of claim 1, wherein selecting the pairs of nodes comprises:

using the second process instead of the first process to select pairs of nodes when the pair of nodes are top level functions, the top level functions not being called by another function.

7. The method of claim 1, wherein the pairs of nodes include the same function call in both the first execution timeline and the second execution timeline in different positions in the call tree of the first execution timeline and the call tree in the second execution timeline.

8. The method of claim 1, wherein selecting the pairs of nodes comprises:

selecting a node in the call tree of the second execution timeline;

determining that the call tree of the first execution timeline does not include a corresponding function; and generating a pair of nodes using an identifier for the node from the second execution timeline and a null value for a node from the first execution timeline, the null value indicating the first execution timeline does not include the corresponding function.

9. The method of claim 1, wherein when iterating through the pairs of nodes to determine (1) whether a node in the second execution timeline is not included in the first execution timeline and has the execution time slower than a set difference, the method further comprises:

selecting the node in the second execution timeline;

determining that a function for a node in the first execution timeline is null; and adding the node in the second execution timeline to the critical graph.

10. The method of claim 1, wherein when iterating through the pairs of nodes to determine (2) whether the first node in the second execution timeline has the execution time slower than the second node in the first execution timeline by the set difference, the method further comprises:

determining a first response time for the first node in the second execution timeline;

determining a second response time for the second node in the first execution timeline; and adding the first node in the second execution timeline to the critical graph when the first response time is greater than the second response time by the set difference.

11. The method of claim 1, wherein when iterating through the pairs of nodes to determine (2) whether the first node in the second execution timeline has the execution time slower than the second node in the first execution timeline by the set difference, the method further comprises:

selecting a descendant pair of nodes connected in the call tree from the first node in the second execution timeline;

determining that a first descendant node in the second execution timeline has a first execution time that is slower than a second execution time for a second descendant node in the first execution timeline by the set difference; and adding the first descendant node from the second execution timeline to the critical graph when the first response time is greater than the second response time by the set difference.

12. The method of claim 1, further comprising:

receiving multiple critical graphs from analyzing different execution timelines for the first version of the application and the second version of the application;

analyzing the multiple critical graphs and the critical graph to generate an aggregated critical graph that includes less nodes than at least one of the multiple critical graphs and the critical graph.

13. The method of claim 12, wherein analyzing the multiple critical graphs and the critical graph comprises:
selecting nodes in the multiple critical graphs and the critical graph that appear in all the multiple critical graphs and the critical graph.

14. The method of claim 12, wherein analyzing the multiple critical graphs and the critical graph comprises:
selecting nodes in the multiple critical graphs and the critical graph that appear in a number of the multiple critical graphs and the critical graph, wherein the number is above a threshold.

15. A non-transitory computer-readable storage medium containing instructions, that when executed, control a computer system to be configured for:
receiving a plurality of execution timelines including nodes organized in a call tree representing function calls and execution times from executing a first version of an application and a second version of the application;
selecting pairs of nodes from a first set of nodes from a first execution timeline in the plurality of execution timelines from the first version of the application and a second set of nodes from a second execution timeline in the plurality of execution timelines from the second version of the application, wherein the pairs of nodes include a same function call in both the first execution timeline and the second execution timeline or when the first execution timeline or the second execution timeline includes a node that is not found in the first execution timeline, wherein selecting the pairs of nodes comprises:
using a first process to select pairs of nodes in the first set of nodes and the second set of nodes, the first process considering an overall order of the functions associated with the first set of nodes and the second set of nodes to select the pairs of nodes; and
switching to a second process to select pairs of nodes when a time to select the pairs meets a threshold, the second process not considering the overall order of the functions;
iterating through the pairs of nodes to determine (1) whether a node in the second execution timeline is not included in the first execution timeline and has an execution time slower than a set difference; or (2) whether a first node in the second execution timeline has an execution time slower than a second node in the first execution timeline by the set difference, wherein the iterating stops when (1) is performed, and when (2) is performed, the iterating is recursively called to determine descendant nodes from any nodes in the pair of nodes where the first node in the second execution timeline has the execution time slower than the second node in the first execution timeline by the set difference, wherein the iteration is stopped when a further pair of nodes is found that does not satisfy the set difference;
adding nodes that meet criteria of (1) or (2) during the iterating to generate a critical graph that defines a path of nodes that lead to a node that has been identified as a performance regression cause.

16. The non-transitory computer-readable storage medium of claim 15, wherein the first set of nodes include one or more functions that are executed in a different order in the first call tree than the second set of nodes in the second call tree and the second set of nodes includes one or more functions that were not in the first set of nodes.

17. The non-transitory computer-readable storage medium of claim 15, further configured for:
removing nodes in the first set of nodes or the second set of nodes that do not meet a criterion before selecting the pairs of nodes.

18. The non-transitory computer-readable storage medium of claim 15, wherein selecting the pairs of nodes comprises:
using the second process instead of the first process to select pairs of nodes when the pair of nodes are top level functions, the top level functions not being called by another function.

19. The non-transitory computer-readable storage medium of claim 15, wherein when iterating through the pairs of nodes to determine (1) whether a node in the second execution timeline is not included in the first execution timeline and has the execution time slower than a set difference, the method further comprises:
selecting the node in the second execution timeline;
determining that a function for a node in the first execution timeline is null; and
adding the node in the second execution timeline to the critical graph.

20. An apparatus comprising:
one or more computer processors; and
a non-transitory computer-readable storage medium comprising instructions, that when executed, control the one or more computer processors to be configured for:
receiving a plurality of execution timelines including nodes organized in a call tree representing function calls and execution times from executing a first version of an application and a second version of the application;
selecting pairs of nodes from a first set of nodes from a first execution timeline in the plurality of execution timelines from the first version of the application and a second set of nodes from a second execution timeline in the plurality of execution timelines from the second version of the application, wherein the pairs of nodes include a same function call in both the first execution timeline and the second execution timeline or when the first execution timeline or the second execution timeline includes a node that is not found in the first execution timeline wherein selecting the pairs of nodes comprises:
using a first process to select pairs of nodes in the first set of nodes and the second set of nodes, the first process considering an overall order of the functions associated with the first set of nodes and the second set of nodes to select the pairs of nodes; and
switching to a second process to select pairs of nodes when a time to select the pairs meets a threshold, the second process not considering the overall order of the functions;
iterating through the pairs of nodes to determine (1) whether a node in the second execution timeline is not included in the first execution timeline and has an execution time slower than a set difference; or (2) whether a first node in the second execution timeline has an execution time slower than a second node in the first execution timeline by the set difference, wherein the iterating stops when (1) is performed, and when (2) is performed, the iterating is recursively called to determine descendant nodes from any nodes in the pair of nodes where the first node in the second execution timeline has the execution time slower than the second node in the first execution timeline by the set difference, wherein the iteration is stopped when a further pair of nodes is found that does not satisfy the set difference;

adding nodes that meet criteria of (1) or (2) during the iterating to generate a critical graph that defines a path of nodes that lead to a node that has been identified as a performance regression cause.

* * * * *